(12) United States Patent
Di Zazzo et al.

(10) Patent No.: US 10,112,704 B2
(45) Date of Patent: Oct. 30, 2018

(54) ELECTRIC BRAKING SYSTEM WITH POWER CONSERVATION AND METHOD OF OPERATING THE SAME

(71) Applicant: Bombardier Inc., Dorval (CA)

(72) Inventors: Marco Di Zazzo, St-Leonard (CA); Bertrand Plante, St-Jérôme (CA)

(73) Assignee: BOMBARDIER INC., Dorval (CA)

( * ) Notice: Subject to any disclaimer, the term of this patent is extended or adjusted under 35 U.S.C. 154(b) by 0 days.

(21) Appl. No.: 14/770,183

(22) PCT Filed: Feb. 27, 2014

(86) PCT No.: PCT/IB2014/000214
§ 371 (c)(1),
(2) Date: Aug. 25, 2015

(87) PCT Pub. No.: WO2014/135946
PCT Pub. Date: Sep. 12, 2014

(65) Prior Publication Data
US 2016/0031553 A1    Feb. 4, 2016

Related U.S. Application Data

(60) Provisional application No. 61/773,529, filed on Mar. 6, 2013.

(51) Int. Cl.
*B64C 25/44* (2006.01)
*B60T 8/17* (2006.01)
(Continued)

(52) U.S. Cl.
CPC ............ *B64C 25/44* (2013.01); *B60T 8/1703* (2013.01); *B60T 8/885* (2013.01); *B64C 25/34* (2013.01);
(Continued)

(58) Field of Classification Search
CPC . B64C 25/44; B64C 25/34; B60T 8/17; B60T 8/00; B60T 8/1703
(Continued)

(56) References Cited

U.S. PATENT DOCUMENTS 6,296,325 B1 * 10/2001 Corio .................... B60T 8/1703
244/110 A
7,875,993 B2    1/2011 Godo
(Continued)

FOREIGN PATENT DOCUMENTS

| CN | 101568458 A | 10/2009 |
| CN | 102079300 A | 6/2011 |
| WO | 2008115307 A2 | 9/2008 |

OTHER PUBLICATIONS

PCT International Search Report and Written Opinion dated Jun. 16, 2014 re: International Patent Application No. PCT/IB2014/000214.
(Continued)

*Primary Examiner* — Isaac G Smith
(74) *Attorney, Agent, or Firm* — Norton Rose Fulbright Canada LLP

(57) ABSTRACT

A method of operating electric brakes (30, 32, 34) on an aircraft (10) in a low power mode of operation includes determining if the aircraft is in a first configuration, if the aircraft is in the first configuration, disengaging power to the electric brakes (30, 32, 34) the from all power supplies (40, 42), determining if the aircraft (10) is in a second configuration, if the aircraft is in the second configuration, engaging power to the electric brakes (30, 32, 34) from one of the power supplies (40, 42), determining if the aircraft (10) is in a third configuration, and if the aircraft (10) is in the third configuration, engaging power to the electric brakes (30, 32, 34) from at least two of the power supplies (40, 42).

26 Claims, 4 Drawing Sheets

(51) Int. Cl.
  *B60T 8/88* (2006.01)
  *B64C 25/34* (2006.01)
(52) U.S. Cl.
  CPC ..... *B60T 2270/414* (2013.01); *B64D 2221/00* (2013.01)
(58) Field of Classification Search
  USPC .......................................................... 701/3
  See application file for complete search history.

(56) References Cited

U.S. PATENT DOCUMENTS

| | | |
|---|---|---|
| 8,204,661 B2 | 6/2012 | Godo |
| 2008/0099603 A1 | 5/2008 | Yamamoto et al. |
| 2008/0154443 A1 | 6/2008 | Godo |
| 2011/0127828 A1 | 6/2011 | Sorin et al. |
| 2012/0273309 A1* | 11/2012 | Thibault ............. B60T 8/00 188/158 |
| 2013/0181448 A1* | 7/2013 | Larson ............. B60L 8/006 290/43 |

OTHER PUBLICATIONS

The State Intellectual Property Office of the People's Republic of China; Notification of First Office Action dated Oct. 14, 2016 re: Application No. 201480011977.1.
English translation of Chinese patent document No. CN 101568458 dated Oct. 28, 2009; www.google.ca./patents . . . .
English translation of Chinese patent document No. CN 102079300A dated Jun. 1, 2011; www.google.ca/patents . . . .
The State Intellectual Property Office of the People's Republic of China; Notification of Second Office Action dated Jun. 28, 2017 re: Application No. 201480011977.1.
European Patent Office; Office Action dated May 11, 2017 re: European Patent Application No. 14710958.1.
The State Intellectual Property Office of the People's Republic of China; Notification of Third Office Action dated Jan. 23, 2018 re: Application No. 201480011977.1.

\* cited by examiner

ELECTRIC BRAKING SYSTEM WITH POWER CONSERVATION AND METHOD OF OPERATING THE SAME

CROSS-REFERENCE TO RELATED APPLICATION(S)

This application is a national phase application under 35 U.S.C. 371 of International Patent Application No. PCT/162014/000214 filed on Feb. 27, 2014, which claims priority from U.S. Provisional Patent Application Ser. No. 61/773,529, filed on Mar. 6, 2013, the entire contents of which are incorporated herein by reference.

FIELD OF THE INVENTION

The present invention concerns the construction and operation of a brake system for an aircraft. More specifically, the present invention involves the construction of and a control scheme for an electric braking system that includes power conservation for selected modes of operation of the aircraft.

Description of the Related Art

Traditionally, aircraft have relied on hydraulic systems to power the brakes on the aircraft.

Electric braking systems offer the same braking power as hydraulic systems. Electric braking systems rely on motors to apply pressure to the brake pads on the aircraft's brakes.

In addition, there is greater dispatchability with multiple redundant motors and brake controllers.

An electrical braking system consumes power from the aircraft's electrical systems during normal operation of the aircraft. The braking system consumes power even when the brakes themselves are not being operated but are in a stand-by mode of operation.

In a normal mode of operation, when the aircraft's systems are fully operational, the power consumption of the braking system does not adversely affect the operation of the aircraft. To the contrary, the power consumption by the braking system is designed into the operation of the aircraft as a whole.

As should be apparent to those skilled in the art, aircraft designers construct aircraft to operate under different flight conditions. One of the circumstances that aircraft designers plan for is a low power mode of operation, such as when the aircraft is operating on emergency power.

When the aircraft is in a low power mode of operation, the aircraft's systems are powered by the batteries on board. In addition, some aircraft are equipped with an air driven generator ("ADG"), which is made available under emergency circumstances on the aircraft. Specifically, in the event of a low power event, the ADG may be extended outside of the aircraft. The ADG is essentially a wind-driven turbine that generates power in response to the movement of the aircraft in the air during flight. The ADG may include, for example, a Ram Air Turbine ("RAT").

As should be apparent to those skilled in the art, when the aircraft enters a low power mode of operation, the only sources of power are the batteries and the ADG. Since these power sources provide limited power, it is considered prudent to implement ways to conserve power.

With this in mind, aircraft designers that choose to incorporate electric brakes on an aircraft also evaluate ways to conserve power in the low power mode of operation.

SUMMARY OF THE INVENTION

The present invention addresses the challenge associated with accommodating voltage variability on board an aircraft.

In one aspect, the present invention provides a method of operating electric brakes on an aircraft in a low power mode of operation. The method includes determining if the aircraft is in a first configuration, if the aircraft is in the first configuration, disengaging power to the electric brakes from all power supplies, determining if the aircraft is in a second configuration, if the aircraft is in the second configuration, engaging power to the electric brakes from one of the power supplies, determining if the aircraft is in a third configuration, and if the aircraft is in the third configuration, engaging power to the electric brakes from at least two of the power supplies.

The present invention contemplates that the power supplies each are part of electrical motor control units.

In addition, the first configuration may be defined at least by an airspeed above a first threshold, a status information for the aircraft, a landing gear position, a landing gear handle UP condition, a landing gear retracted condition, and/or a weight off wheels configuration.

The second configuration may be defined at least by an airspeed below a first threshold and above a second threshold, a status information from the RAT/ADG systems, and/or a weight off wheels configuration.

The third configuration may be defined by an airspeed below a second threshold, a status of the airplane on the ground (WOW), a weight off wheels configuration, a wheel speed, and/or a weight on wheels configuration.

It is contemplated that the power supplies encompass a plurality of batteries, an air driven generator, and/or a ram air turbine.

The present invention also provides an aircraft operational in a low power mode of operation. The aircraft includes a plurality of redundant power systems, a plurality of landing gears, a plurality of electrical brakes, at least one associated with each landing gear wheel, and a brake controller operatively connected to the electrical brakes, wherein the brake controller determines if the aircraft is in a first configuration and, if the aircraft is in the first configuration, disengages power to the electric brakes from all power supplies, determines if the aircraft is in a second configuration and, if the aircraft is in the second configuration, engages power to the electric brakes from one of the power supplies, and determines if the aircraft is in a third configuration and, if the aircraft is in the third configuration, engages power to the electric brakes from at least two of the power supplies.

The present invention also provides for an electric brake system for an aircraft in a low power mode of operation that includes electric brakes, at least one power supply connected to the electric brakes, and a brake controller controlling the operation of the electric brakes. If the aircraft is in a first configuration, power to the electric brakes is disengaged from all power supplies, if the aircraft is in a second configuration, engaging power to the electric brakes from one of the power supplies, and if the aircraft is in a third configuration, engaging power to the electric brakes from at least two of the power supplies.

The present invention also provides a set of instructions executable by a processor that determines if the aircraft is in a first configuration, if the aircraft is in the first configuration, disengages power to the electric brakes from all power supplies, determines if the aircraft is in a second configuration, if the aircraft is in the second configuration, engages power to the electric brakes from one of the power supplies, determines if the aircraft is in a third configuration, and if the aircraft is in the third configuration, engages power to the electric brakes from at least two of the power supplies.

Further aspects of the present invention will be made apparent form the paragraphs that follow.

BRIEF DESCRIPTION OF THE DRAWING(S)

The present invention will now be described in connection with the drawing appended hereto, in which.

DETAILED DESCRIPTION OF EMBODIMENT(S) OF THE INVENTION

The present invention will now be described in connection with one or more embodiments thereof. The discussion of any particular embodiment is not intended to be limiting of the present invention. To the contrary, the discussion of selected embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

The present invention will now be discussed in the content of the construction of an aircraft 10, such as the one illustrated in the perspective view provided in FIG. 1.

Figure 1:
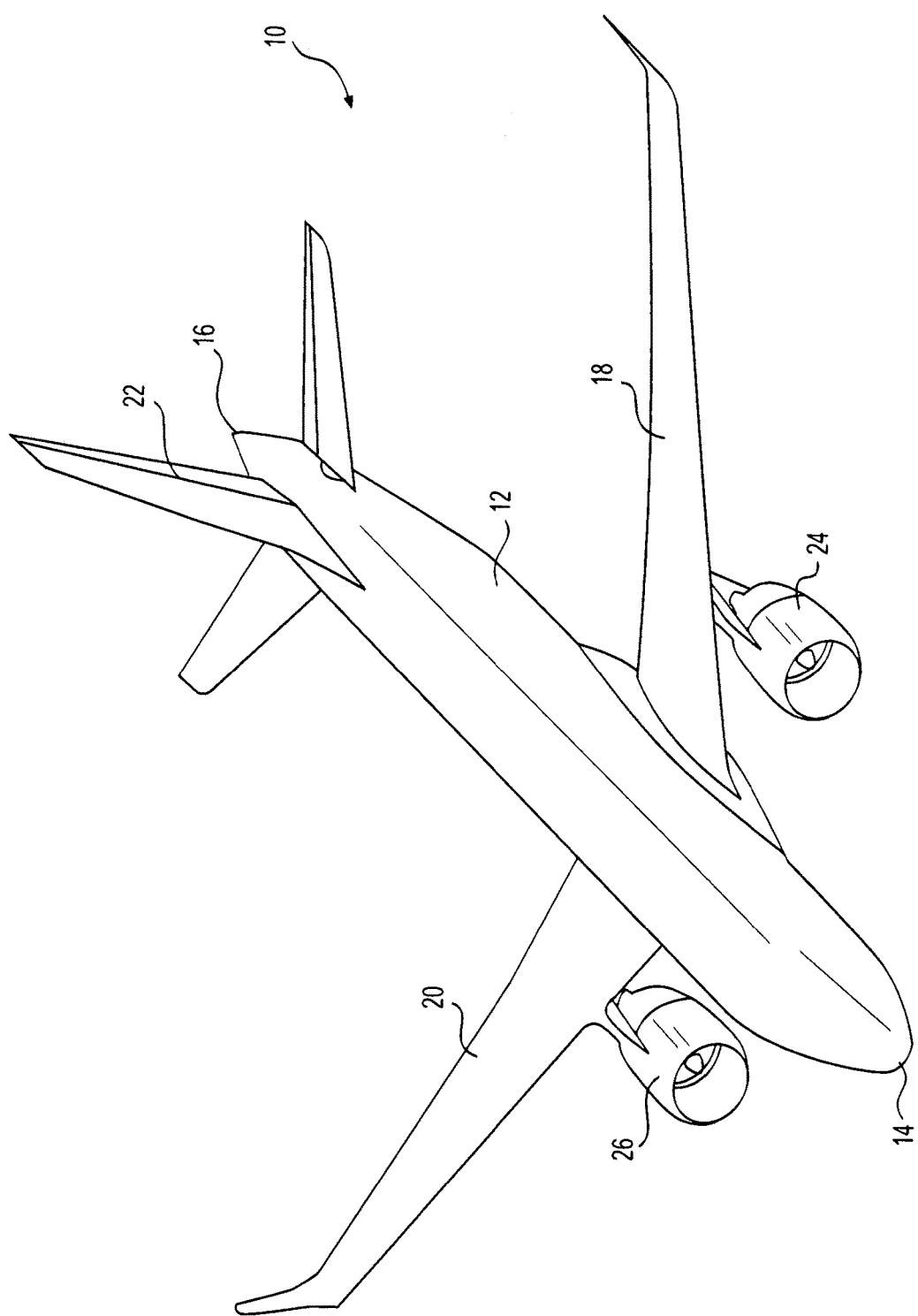
FIG. 1 is a perspective illustration of an aircraft of the type on which the electrical braking system of the present invention may be employed.

FIG. 1 is a perspective illustration of an aircraft 10 to which the present invention applies. The aircraft 10 includes a fuselage 12 defining a forward end 14 and a rear (or aft) end 16. Two wings 18, 20 extend laterally from the fuselage 12. A tail section 22 is attached to the rear end 16 of the aircraft. As should be apparent to those skilled in the art, the wings 18, 20 and the tail section 22 incorporate multiple control surfaces that are responsible for flying characteristics and flight operations of the aircraft 10. Two engines 24, 26 are suspended from and connect to the wings 18, 20, as illustrated. As should be apparent to those skilled in the art, the two engines 24, 26 could alternatively be located at the rear end 16 of the aircraft without departing from the scope of the present invention.

The brakes on an aircraft 10 typically are disk brakes, very similar to those that may are found on automobiles. Brake pads are positioned on either side of the rotor. The caliper (or calipers) applies pressure to the brake pads to squeeze the rotor. The greater the pressure applied, the higher the braking force.

With respect to the aircraft 10 of the present invention, electrical motors connect to the brake disks to apply pressure thereto. The pressure applied by the motors corresponds to the power generated by the motors. That power is provided by the Electrical Motor Control Units ("EMCUs") 41, 43, which are powered by the aircraft's on-board power systems 40, 42. In an alternative embodiment additional EMCUs units and on-board power systems such as EMCUs 39 and on-board power systems 38 may be provided without departing from the scope of the present invention.

As noted above, when the aircraft 10 is operating in a low power mode, the aircraft 10 is anticipated to be running on back-up batteries. As also noted above, the aircraft 10 also may be equipped with an ADG 50 to provide additional power, such as, for example, a RAT.

When the aircraft 10 is approaching a runway for landing, the air speed of the aircraft 10 will decrease. As a result, any power provided by the ADG 50 will decrease as the aircraft 10 approaches the runway in preparation for landing. This might leave only the batteries 46, 48 as a possible source of power. As should be apparent to those skilled in the art, battery power on the aircraft 10 is limited.

Figure 2:
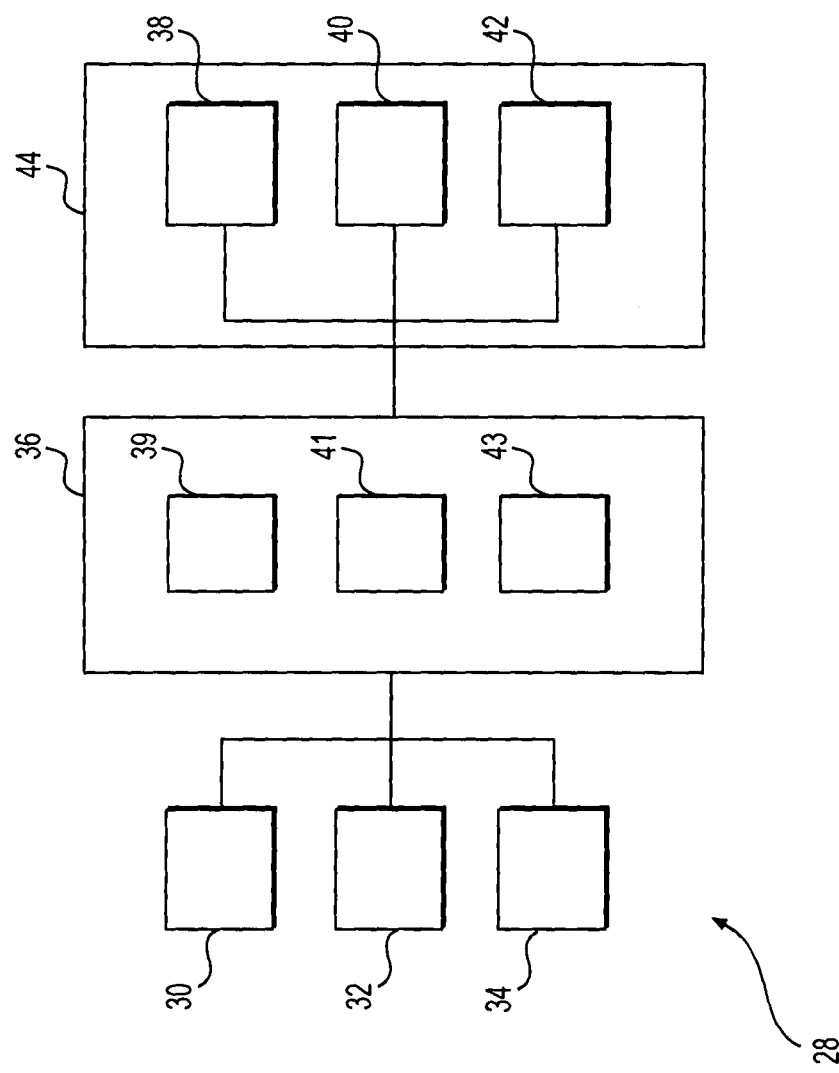
FIG. 2 is a graphical illustration of one aspect of a braking system according to the present invention.
Figure 3:
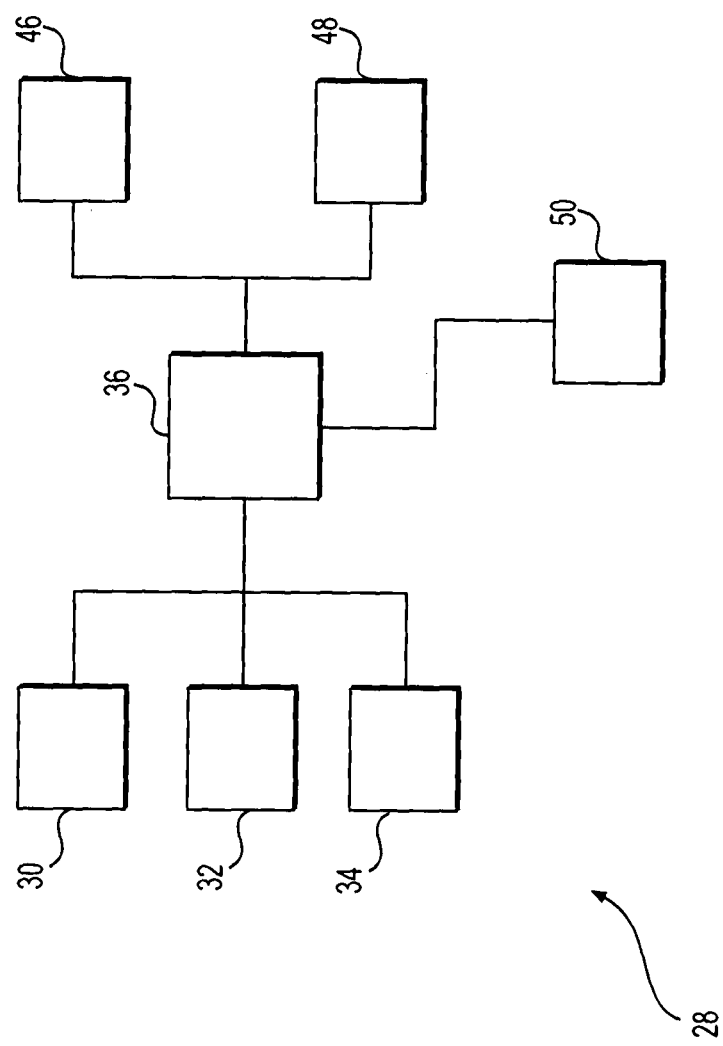
FIG. 3 is a graphical illustration of another aspect of the braking system according to the present invention.

In the aircraft 10 of the present invention, the brake system is an electric brake system 28, some of the details of which are illustrated in FIGS. 2 and 3.

In the embodiment illustrated in FIGS. 2 and 3, the braking system 28 includes two separate brakes sets 32, 34. The brake set 32 is associated with the main landing gear on the port side of the aircraft 10. The brake set 34 is associated with the main landing gear on the starboard side of the aircraft 10.

It is noted that the aircraft 10 may have a larger number of brakes associated with each landing gear without departing from the scope of the present invention. In addition, the aircraft 10 may include more than two sets of landing gear without departing from the scope of the present invention. For example, the braking system 28 may include a third brake set 30 associated with a landing gear at the nose 14 of the aircraft 10.

The brakes 32, 34 are connected to a brake controller 36. The braking system 28 includes an Electrical Motor Brake 44 ("EMB") that contains the two internal high power supplies 40, 42. Two power supplies 40, 42 are provided on the aircraft 10 for redundancy.

FIG. 3 is a graphical illustration of the braking system 28 of the present invention when the braking system 28 is operating in a low power mode of operation. In the low power mode, the braking system and the brake controller 36 receive power from two batteries 46, 48 and one ADG 50, all of which are part of the power supply system on board the aircraft 10.

As an aside, the aircraft 10 may include a larger or a fewer number of batteries 46, 48 without departing from the scope of the present invention. In addition, the aircraft 10 may include additional ADGs 50 without departing from the scope of the present invention.

As should be apparent from FIGS. 2 and 3, the illustrated embodiment of the present invention provides an aircraft 10 incorporating a dual battery power system. The present invention is not intended to be limited to an aircraft 10 with a doubly-redundant power system. An aircraft with a different number of power systems and/or batteries is intended to be encompassed within the scope of the present invention.

When the aircraft 10 is operating under full power (i.e., normal power) with full power braking (i.e., normal braking), it is contemplated that the electric brakes 32, 34 receive power from the high power supplies 40, 42 within the electrical motor control units.

During flight, the electric brakes 32, 34 are contemplated to be deactivated, but the braking system 28 (i.e., the processing portion of the braking system 28) remains powered. Deactivation of the electric brakes 32, 34 may be triggered by a combination of criteria including, but not limited to, the locking of the landing gear in their respective, retracted positions.

In the normal mode of operation, power for the electric brakes 32, 34 is re-engaged when the braking controller 36 receives suitable input from one or more of the aircraft systems. For example, the electric brakes 32, 34 may be re-energized when the altitude, and speed of the aircraft 10 reach predetermined set point values indicative of an approach of the aircraft 10 to a runway. Other factors that may be considered include a persistence of signals from aircraft system interfaces (such as a landing gear system). Loss of communication also may be a variable taken into account by the brake controller 36.

Regardless of the variables that are taken into account, it is noted that the logic underlying the activation and deactivation of the brake controller 36 may be implemented in software, in hardware, or a combination of the two. As such, the brake controller 36 may be a processor or a combination of a processor with other electronics on board the aircraft. In addition, it is noted that the brake controller 36 need not be a separate component on the aircraft 10. To the contrary, the brake controller 36 may be a part of another component on the aircraft 10.

When the aircraft is operating in a low power mode of operation, as illustrated in FIG. 3, power is provided from the batteries 46, 48 or the ADG 50. To conserve power, the motor brake controller high power supplies (i.e., the batteries 46, 48, and the ADG 50) do not provide power to the electric brakes 32, 34 if certain conditions are fulfilled. For example, if the landing gear are locked in a retracted position and the aircraft is above a certain altitude, power will not be provided to the electric brakes 32, 34, just as with the normal power condition.

In the low power mode of operation, when certain predetermined conditions of the aircraft 10 are fulfilled, the brake controller initially will activate one of the motor brake controller high power supply channels on the aircraft 10. As noted above, power from the three power supplies are provided by the batteries 46, 48, and/or the ADG 50.

It is contemplated, for example, that one of the redundant high power supplies 40, 42 will be turned on when the aircraft 10 reaches a predetermined airspeed and the aircraft 10 is in a predetermined configuration. Predetermined configurations include, but are not limited to "weight on wheels" or "WOW" and "weight off wheels" or "WOFFW." For example, when the aircraft 10 is taxiing on the runway, the configuration of the aircraft is WOW. When the configuration is WOW, it is contemplated that power supplies 40, 42 will provide power to the electric brakes 32, 34 for maximum operability of the aircraft 10.

As noted above, in a first low power mode of operation, when the aircraft 10 is flying at a predetermined speed 10 above a first threshold and the configuration of the aircraft 10 is WOFFW, the two electric brakes 32, 34 will be unpowered while the control unit may remain powered for monitoring.

In a second low power mode of operation, when the aircraft speed is below a second threshold and the configuration of the aircraft 10 is WOFFW, initially the brake controller 36 will route power only from one of the high power supplies 40, 42 to the electric brakes 32, 34. Accordingly, the electric brakes 32, 34 are powered, but the brake controller 36 conserves power by delaying application of power from the remaining, redundant, high power supplies.

In a third, third low power mode of operation, the electric brakes 32, 34 receive power from the high power supplies 40, 42. In the third, low power mode of operation, the high power supplies 40, 42 provide power to the electric brakes 32, 34 when the aircraft satisfies a predetermined number of operational criteria. For example, when the aircraft 10 reaches a predetermined airspeed 10 (i.e., below the second threshold) and the configuration is WOFFW.

So that power is conserved to assure that the aircraft 10 has sufficient power to reach its destination, the brake controller 36 may take into account additional variable before activating all two power supplies 40, 42 in the third, low power mode of operation. For example, the brake controller 36 may take into account the total amount of battery power that is available. In addition, the brake controller 36 may take into account the operational limits of the ADG 50.

It is noted that the electric brakes 32, 34 need only be powered by one of the high power supplies to be operational to provide sufficient braking capability. As noted above, the remaining two power supplies are redundant. Therefore, if two power supplies were to fail, the aircraft 10 would remain fully functional by relying on the remaining, operational, high power supply.

During maintenance operations, the braking system 28 of the aircraft 10 may operate according to a further set of variables. In the maintenance mode of operation, the aircraft 10 is WOW, typically parked in an aircraft maintenance hangar or on the tarmac. Here, one of the redundant power supplies 40, 42 may not provide power to the electric brakes 32, 34. Power from this redundant power supply 40, 42 is made available when a predetermined set of conditioned exist. For example, if the brake controller 36 detects that the aircraft 10 is WOW and that the thrust of the engines exceeds a predetermined thrust threshold, power from the remaining power supply will be applied to the electric brakes 36.

Figure 4:
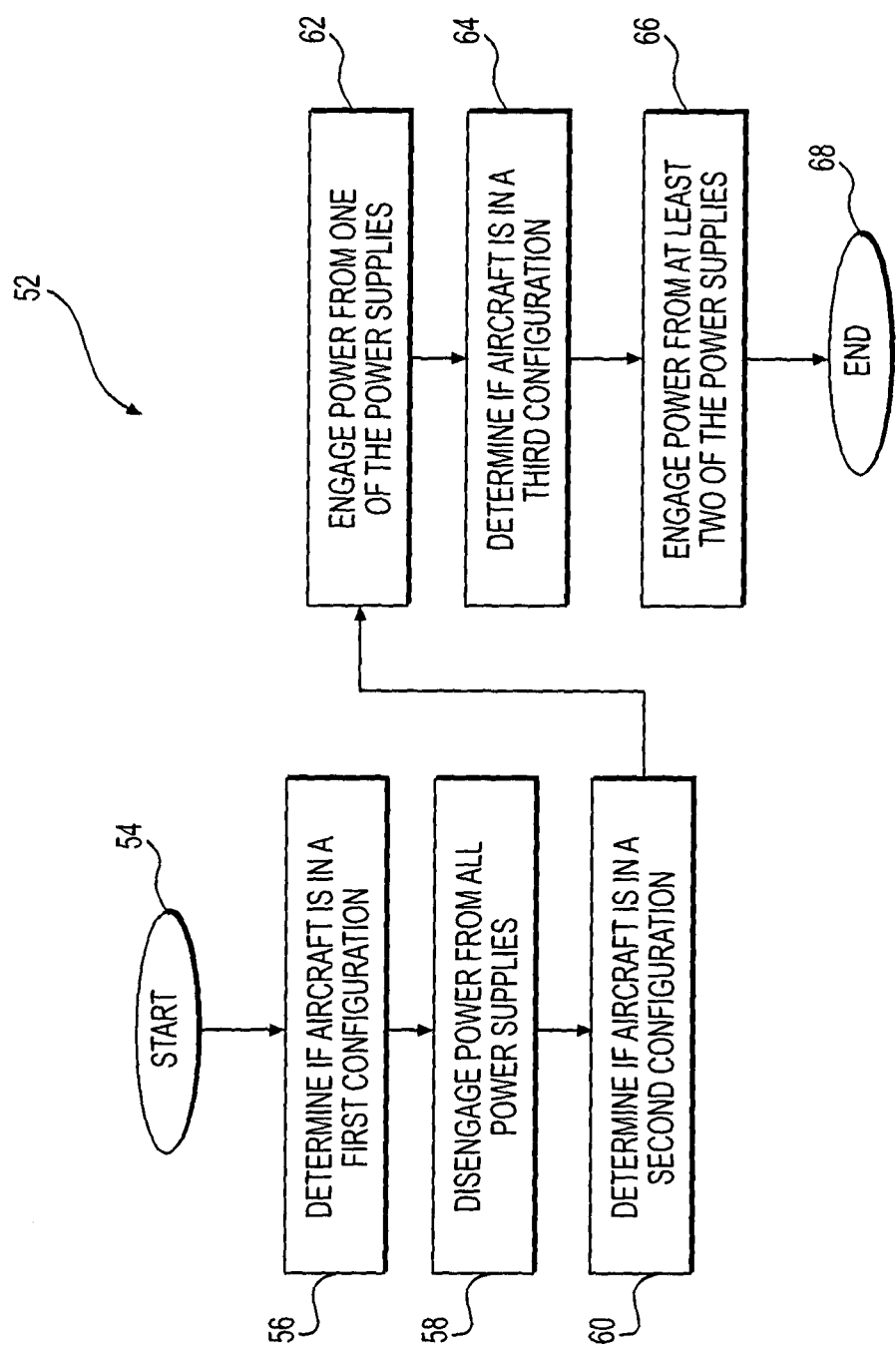
FIG. 4 is a flow chart outlining one method contemplated for operation of the braking system of the present invention.

FIG. 4 provides a flow chart that illustrates one method 52 of operation of the braking system 28 of the present invention. In this illustration, it is assumed that the aircraft 10 is operating in a low power mode of operation. In other words, it is assumed that the aircraft 10 is operating on emergency power.

The method 52 begins at step 54.

The method proceeds to step 56 where a determination is made if the aircraft 10 is in a first configuration. The first configuration is contemplated to encompass conditions when the aircraft 10 is in flight, well before landing. A number of variables may define this first configuration. For example, it is contemplated that the aircraft speed will be above a first threshold and that the aircraft will be WOFFW. In this first configuration, power to the electric brakes 32, 34 is disengaged as indicated by step 58.

The first configuration may be defined by an airspeed above a first threshold. Alternatively, the first configuration may be defined by a status information for the aircraft (i.e., WOW, WOFFW, etc.), landing gear position, a landing gear handle UP condition, and a landing gear retracted condition. Other variables also may be utilized to define the first configuration, as should be apparent to those skilled in the art.

At step 60, the brake controller 26 determines if the aircraft 10 is in a second mode of operation or a second configuration. In this second mode of operation, which is expected to exist when the aircraft is approaching landing, the air speed of the aircraft 10 is considered to be below the first threshold but above a second threshold. In this second configuration, as indicated by step 62, power is engaged from one of the power supplies 40, 42.

As noted, the second configuration may be defined by an airspeed for the aircraft that is below a first threshold and above a second threshold. Alternatively, the second configuration may be defined by the status information from the RAT/ADG systems or the status of the aircraft 10 (i.e., WOW). Other indicators also may be employed to define the second configuration.

The method then proceeds to step 64, where the brake controller 36 determines if the aircraft 10 is in a third configuration. In this third configuration, the aircraft 10 is near to landing. As a result, the method proceeds to step 66, where power from the power supplies 40, 42 is supplied to the electric brakes 32, 34.

The third configuration may be defined by variables such as an airspeed for the aircraft 10 that is below the second threshold. The third configuration also may be defined by a status of the status of the airplane on the ground (i.e., WOW), or by a wheel speed.

The method ends at step 68.

As should be apparent, the steps included in the method 52 need not be executed in the order described. The steps may be executed in a different order without departing from the scope of the present invention.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A method of operating electric brakes on an aircraft in a low power mode of operation, comprising:
   determining if the aircraft is in a first configuration in which the aircraft is in flight, wherein the first configuration is defined at least by an airspeed above a first threshold;
   if the aircraft is in the first configuration, keeping a brake controller of the electric brakes powered and disengaging power to the electric brakes from all of a plurality of power supplies;
   determining if the aircraft is in a second configuration;
   if the aircraft is in the second configuration, engaging power to the electric brakes from only one of the power supplies;
   determining if the aircraft is in a third configuration; and
   if the aircraft is in the third configuration, engaging power to the electric brakes from at least two of the power supplies.

2. The method of claim 1, wherein the power supplies each are part of electrical motor control units.

3. The method of claim 1, wherein the first configuration also is defined by at least one of status information for the aircraft, landing gear position, a landing gear handle UP condition, and a landing gear retracted condition.

4. The method of claim 1, wherein the first configuration also is defined at least by a weight off wheels configuration.

5. The method of claim 1, wherein the second configuration is defined at least by the airspeed below the first threshold and above a second threshold.

6. The method of claim 5, wherein the second configuration also is defined by at least one of a status information from the RAT/ADG systems.

7. The method of claim 5, wherein the second configuration also is defined at least by a weight off wheels configuration.

8. The method of claim 1, wherein the third configuration is defined at least by the airspeed below a second threshold.

9. The method of claim 5, wherein the third configuration also is defined by a status of the airplane on the ground (WOW).

10. The method of claim 5, wherein the third configuration also is defined by a weight off wheels configuration.

11. The method of claim 5, wherein the third configuration also is defined by a wheel speed.

12. The method of claim 5, wherein the third configuration also is defined by a weight on wheels configuration.

13. The method of claim 1, wherein the power supplies comprise a plurality of batteries.

14. The method of claim 13, wherein the power supplies further comprise an air driven generator.

15. The method of claim 13, wherein the power supplies comprise a ram air turbine.

16. An aircraft operational in a low power mode of operation, comprising:
   a plurality of redundant power supplies;
   a plurality of landing gears;
   a plurality of electrical brakes, at least one associated with each landing gear wheel; and
   a brake controller operatively connected to the electrical brakes, wherein the brake controller:
      determines if the aircraft is in a first configuration in which the aircraft is in flight and, if the aircraft is in the first configuration, disengages power to the electric brakes from all redundant power supplies while keeping the brake controller powered, wherein the first configuration is defined at least by an airspeed above a first threshold;
      determines if the aircraft is in a second configuration and, if the aircraft is in the second configuration, engages power to the electric brakes from only one of the redundant power supplies; and
      determines if the aircraft is in a third configuration and, if the aircraft is in the third configuration, engages power to the electric brakes from at least two of the redundant power supplies.

17. The aircraft of claim 16, wherein the first configuration also is defined at least by a weight off wheels configuration.

18. The aircraft of claim 16, wherein the second configuration is defined at least by the airspeed below the first threshold and above a second threshold.

19. The aircraft of claim 18, wherein the second configuration also is defined at least by a weight off wheels configuration.

20. The aircraft of claim 16, wherein the third configuration is defined at least by the airspeed below a second threshold.

21. The aircraft of claim 20, wherein the third configuration also is defined by a weight off wheels configuration.

22. The aircraft of claim 20, wherein the third configuration also is defined by a weight on wheels configuration.

23. The aircraft of claim 16, wherein the power supplies comprise a plurality of batteries.

24. A set of instructions stored in a non-transitory machine-readable medium and executable by a processor, wherein the set of instructions:
   determines if the aircraft is in a first configuration in which the aircraft is in flight, wherein the first configuration is defined at least by an airspeed above a first threshold;
   if the aircraft is in the first configuration, keeps a brake controller of the electric brakes powered and disengages power to the electric brakes from all of a plurality of power supplies;
   determines if the aircraft is in a second configuration;
   if the aircraft is in the second configuration, engages power to the electric brakes from only one of the power supplies;

determines if the aircraft is in a third configuration; and
if the aircraft is in the third configuration, engages power to the electric brakes from at least two of the power supplies.

25. An electric brake system for an aircraft in a low power mode of operation, comprising:
electric brakes;
a plurality of power supplies for supplying power to the electric brakes; and
a brake controller controlling the operation of the electric brakes, the brake controller being configured to:
disengage power to the electric brakes from all of the power supplies when the aircraft is in a first configuration in which the aircraft is in flight while keeping the brake controller powered, wherein the first configuration is defined at least by an airspeed above a first threshold; and
engage power to the electric brakes from one of the power supplies when the aircraft is in a second configuration.

26. An electric brake system for an aircraft, comprising:
electric brakes;
a plurality of redundant power supplies for supplying power to the electric brakes; and
a brake controller configured to control the operation of the electric brakes during a low power mode of operation of the aircraft, the brake controller being configured to:
disengage power to the electric brakes from all of the redundant power supplies when the aircraft is in a first configuration in which the aircraft is in flight, wherein the first configuration is defined at least by an airspeed above a first threshold;
engage power to the electric brakes from only one of the redundant power supplies when the aircraft is in a second configuration; and
engage power to the electric brakes from two of the redundant power supplies when the aircraft is in a third configuration.

* * * * *